United States Patent
Czyrka et al.

(10) Patent No.: US 12,187,140 B2
(45) Date of Patent: Jan. 7, 2025

(54) VEHICLE HAVING A HIGH-VOLTAGE STORE AND METHOD FOR GENERATING AN ACOUSTIC WARNING SIGNAL

(71) Applicant: Bayerische Motoren Werke Aktiengesellschaft, Munich (DE)

(72) Inventors: Kevin Czyrka, Munich (DE); Bastian Huber, Munich (DE); Johannes Kurtz, Rott a. Inn (DE); Nadine Schoewel, Munich (DE); Jochen Zeyher, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 300 days.

(21) Appl. No.: 17/057,807

(22) PCT Filed: Jun. 13, 2019

(86) PCT No.: PCT/EP2019/065431
§ 371 (c)(1),
(2) Date: Nov. 23, 2020

(87) PCT Pub. No.: WO2020/007582
PCT Pub. Date: Jan. 9, 2020

(65) Prior Publication Data
US 2021/0210805 A1    Jul. 8, 2021

(30) Foreign Application Priority Data
Jul. 6, 2018    (DE) .................... 10 2018 211 162.6

(51) Int. Cl.
*B60L 50/64*     (2019.01)
*H01M 10/48*     (2006.01)
*H01M 50/30*     (2021.01)

(52) U.S. Cl.
CPC .......... *B60L 50/64* (2019.02); *H01M 10/482* (2013.01); *H01M 10/488* (2013.01);
(Continued)

(58) Field of Classification Search
CPC ............. H01M 2200/20; H01M 50/30; H01M 50/569; H01M 10/482; H01M 10/488;
(Continued)

(56) References Cited

U.S. PATENT DOCUMENTS

| | | |
|---|---|---|
| 2013/0017421 A1 | 1/2013 | Onnerud et al. |
| 2014/0038006 A1 | 2/2014 | Sturm et al. |
| 2017/0338526 A1* | 11/2017 | Poirier ................ H01M 10/482 |

FOREIGN PATENT DOCUMENTS

| | | |
|---|---|---|
| CN | 201956406 U | 8/2011 |
| CN | 102823026 A | 12/2012 |

(Continued)

OTHER PUBLICATIONS

Machine Translations of DE 102012205253 A1 (Year: 2012).*
(Continued)

*Primary Examiner* — Jonathan G Leong
*Assistant Examiner* — Katharine A Caughron
(74) *Attorney, Agent, or Firm* — Crowell & Moring LLP

(57) ABSTRACT

A vehicle has a high-voltage store, which is provided for storing electrical energy, wherein the high-voltage store has a high-voltage store housing, in which a plurality of electrical storage cells are arranged, and a device is provided in the high-voltage store housing through which the gas escaping from one or more of the storage cells into the interior of the high-voltage store housing can escape outwards from the high-voltage store housing into the environment. The device has a purely mechanical acoustic signal generator which is provided in order to generate an acoustic warning signal
(Continued)

when gas flows through the device, wherein the warning signal is generated merely by the gas flowing through.

11 Claims, 1 Drawing Sheet

(52) U.S. Cl.
CPC ........ *H01M 50/30* (2021.01); *H01M 2200/20* (2013.01); *H01M 2220/20* (2013.01)

(58) Field of Classification Search
CPC ... H01M 2220/20; H01M 10/48; B60L 50/64; Y02E 60/10; Y02T 10/70; G08B 3/02; G08B 17/04; G10K 5/00
See application file for complete search history.

(56) References Cited

FOREIGN PATENT DOCUMENTS

| | | | |
|---|---|---|---|
| CN | 103460471 A | 12/2013 | |
| CN | 107068935 A | 8/2017 | |
| DE | 10 2011 016 527 A1 | 10/2012 | |
| DE | 102012205253 A1 * | 10/2013 | .......... B60L 11/1879 |
| EP | 2845546 A1 * | 3/2015 | ....... A61B 17/00234 |
| FR | 3097371 A1 * | 12/2020 | |
| KR | 2013063207 A * | 6/2013 | |
| WO | WO 2013/143736 A1 | 10/2013 | |
| WO | WO-2014072073 A1 * | 5/2014 | ........... B63H 20/007 |

OTHER PUBLICATIONS

Machine Translation of WO 2014072073 A1 (Year: 2014).*
Espacenet machine translation of FR-3097371-A1 (Year: 2019).*
International Search Report (PCT/ISA/210) issued in PCT Application No. PCT/EP2019/065431 dated Aug. 21, 2019 with English translation (eight (8) pages).
German-language Written Opinion (PCT/ISA/237) issued in PCT Application No. PCT/EP2019/065431 dated Aug. 21, 2019 (11 pages).
German-language Search Report issued in German Application No. 10 2018 211 162.6 dated Apr. 26, 2019 with partial English translation (12 pages).
Chinese-language Office Action issued in Chinese Application No. 201980030156.5 dated Apr. 17, 2023 with English translation (19 pages).

* cited by examiner

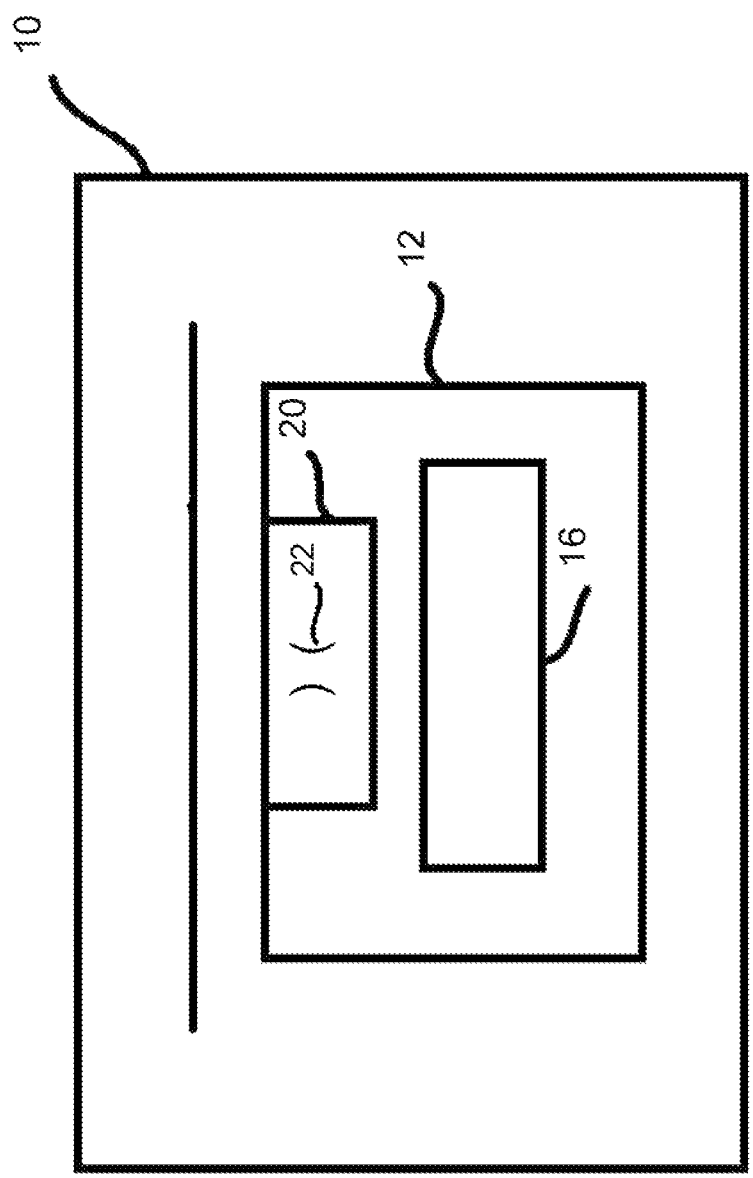

VEHICLE HAVING A HIGH-VOLTAGE STORE AND METHOD FOR GENERATING AN ACOUSTIC WARNING SIGNAL

BACKGROUND AND SUMMARY OF THE INVENTION

The present invention relates to a vehicle having a high-voltage energy store and to a method for generating an acoustic warning signal.

Hybrid vehicles or electric vehicles have a high-voltage store which is normally formed by a multiplicity of battery cells which are accommodated in a high-voltage store housing. In the event of serious accidents, individual battery cells can be damaged, which can result in short circuits and high electrical currents. In extreme cases, a large increase in temperature and pressure in the interior of the battery cells and possibly leakage of hot or burning gases from individual battery cells can occur. If, in the interior of the high-voltage store housing, such damage or defects where hot or burning gas leaks from individual battery cells occur, then the vehicle occupants must be warned immediately.

The thermal energy in the cells that is produced as a result of a fault, such as for example a short circuit, cell ageing, cell chemistry loading due to introduction of foreign particles, etc., remains in the battery, however. The additional thermal loading gives rise to constant loading of the cell chemistry. This additional loading can, in the worst case, lead to irreversible damage to the cell. Such damage can mean for example the opening of the cell and the leakage of electrolyte.

Owing to the thermal coupling of all the cells, a "thermal event" cannot be ruled out. The thermal event means that, owing to the release of energy of a cell, all the adjacent cells undergo additional thermal loading and, for their part, are caused to release energy, for example through leakage of electrolyte. In the event of leakage of electrolyte, the development of a fire and the leakage of toxic, potentially lethal gases is readily to be expected, which of course represents a state of a lithium-ion battery that is to be avoided.

It is known to detect such dangerous states by way of sensors, such as for example temperature sensors, electrical voltage sensors, etc., and to identify said states by means of evaluation electronics. Such safety or warning concepts are however associated with a high technical outlay in terms of safeguarding.

It is an object of the invention to provide a vehicle having a high-voltage store, and to specify a method, in/with which such safety-critical states can be detected, and the vehicle occupants can be informed thereof, in a simple manner.

This object is achieved by the features of the independent patent claims. Advantageous configurations and refinements of the invention emerge from the dependent claims.

The basic concept of the invention consists in discharging into the surroundings gas which leaks out of battery cells into the interior of the high-voltage store housing, and in providing a purely mechanical acoustic signal generator which generates an acoustic warning signal upon the outflow of the gas.

BRIEF DESCRIPTION OF THE DRAWING

The FIGURE is a highly schematic block diagram illustrating the vehicle and method according to an embodiment of the invention.

DETAILED DESCRIPTION OF THE DRAWING

A vehicle 10 includes a high-voltage store provided for storing electrical energy. The high-voltage store has a high-voltage store housing 12 in which multiple electrical storage cells 16 are arranged. A device 20 is provided in the high-voltage store housing 12. Gas escaping from one or more of the storage cells 16 into an interior of the high-voltage store housing 12 escapes outward through the device 20 into the surroundings. The device 20 has a purely mechanical acoustic signal generator 22 provided for generating an acoustic warning signal in an event of the escaping gas through the device. The warning signal is generated merely by way of the gas throughflow.

The starting point of the invention is a vehicle having a high-voltage store which is provided for storing electrical energy by which a vehicle propulsion-generating electric drive motor is driven. The high-voltage store has a high-voltage store housing in which multiple electrical storage cells are arranged. Provided in or on the high-voltage store housing is a device through which gas escaping from one or more storage cells into the interior of the high-voltage store housing can escape outward from the high-voltage store housing into the surroundings.

The core of the invention, which relates to a vehicle of said type, consists in the aforementioned device having a purely mechanical acoustic signal generator which is provided for generating an acoustic warning signal in the event of gas flowing through the device, wherein the warning signal is generated merely by way of the throughflow of gas and not, for example, by way of an electrical actuation means or an electrical signal transducer.

As already mentioned, the invention relates not only to a vehicle of said type, but also to a method for generating an acoustic warning signal in a vehicle having a high-voltage store which is provided for storing electrical energy, wherein the high-voltage store has a high-voltage store housing in which multiple storage cells are arranged. Provided in the high-voltage store housing is a device through which gas escaping from one or more storage cells into the interior of the high-voltage store housing can escape outward from the high-voltage store housing into the surroundings. The core of the method according to the invention is that the warning signal, which informs vehicle occupants that gas is escaping from one or more storage cells, is, by means of a purely mechanical acoustic signal generator which is provided in or on the device, generated merely by way of the escape of the gas from the high-voltage store housing.

It may be provided that the signal generator is caused to perform mechanical oscillations by the gas, or that the gas is caused to perform acoustic oscillations by the signal generator. In the simplest case, the signal generator may be a whistle or a pipe, similar to what is known from traditional kettles, in which the hot water vapor escaping via the whistle or pipe produces a whistling sound.

According to a refinement of the invention, it is provided that, upon exceedance of a predefined gas volume flow through the device and/or upon exceedance of a predefined pressure gradient from the interior of the high-voltage store in relation to the ambient air pressure, the signal generator generates a warning signal with a sound intensity, which is reliably audible in the passenger compartment even while the vehicle is travelling and in particular even with the windows closed, that is to say in the enclosed passenger compartment of the vehicle.

It may for example be provided that, upon exceedance of a predefined gas volume flow through the device and/or upon exceedance of a predefined pressure gradient from the interior of the high-voltage store housing in relation to the ambient air pressure, the signal generator generates a warning signal having a predefined minimum sound intensity.

The aforementioned device may be a device which permits an exchange of gas both from the interior of the high-voltage store housing into the surroundings and from the surroundings into the interior of the high-voltage store housing. In this way, an exchange of pressure between the interior of the high-voltage store housing and the surroundings is therefore possible.

According to a refinement of the invention, the device has a semipermeable membrane which is arranged such that it permits an exit of liquid or moisture or water from the interior of the high-voltage store housing into the surroundings, but prevents an entry of liquid or moisture or water from the surroundings into the interior of the high-voltage store housing.

According to a refinement of the invention, the device has an element which is provided for being caused to perform mechanical oscillations in the event of gas flowing through the device or in the event of gas flowing past the element, and/or which causes the gas to perform acoustic oscillations in the event of gas flowing through or in the event of gas flowing past, similar to what is known from organ pipes.

It may furthermore be provided that the device is arranged such that gas flowing through flows against a "component" of the vehicle body after flowing out of the high-voltage store housing, whereby the vehicle body is caused to perform acoustic oscillations. For example, it may be provided that the gas is guided against a floor panel or a fender panel or another part of the vehicle body that functions as a "resonance body" and thus effects amplification of the sound intensity.

What is claimed is:

1. A vehicle, comprising:
   a store provided for storing electrical energy, the store having a store housing in which multiple electrical storage cells are arranged, and
   a device provided in the store housing through which gas escaping from one or more of the storage cells into an interior of the store housing escapes outward from the store housing into surroundings, wherein
   the device includes a purely mechanical acoustic signal generator provided for generating an acoustic warning signal in an event of the escaping gas flowing through the device, wherein the warning signal is generated merely by way of the gas throughflow of the escaping gas, and
   the device is arranged such that the escaping gas that flows through the device impacts a component of the vehicle body, whereby the vehicle body is caused to perform acoustic oscillations and amplify a sound intensity of the warning signal.

2. The vehicle according to claim 1, wherein
   the signal generator is caused to perform mechanical oscillations by the gas, or causes the gas to perform acoustic oscillations.

3. The vehicle according to claim 1, wherein
   the device permits an exchange of gas both from the interior of the store housing into the surroundings and from the surroundings into the interior of the store housing.

4. The vehicle according to claim 1, wherein
   the device has a semipermeable membrane which permits an exit of water from the interior of the store housing into the surroundings, but prevents an entry of water from the surroundings into the interior of the store housing.

5. The vehicle according to claim 1, wherein
   the device has an element provided for being caused to perform mechanical oscillations in the event of gas flowing through or in the event of gas flowing past, and/or which causes the gas to perform acoustic oscillations in the event of gas flowing through or in the event of gas flowing past.

6. A method for generating an acoustic warning signal in a vehicle having a store provided for storing electrical energy, wherein
   the store has a store housing in which multiple electrical storage cells are arranged, and
   a device is provided in the store housing through which gas escaping from one or more of the storage cells into an interior of the store housing escapes outward from store housing into surroundings,
   the method comprising:
   providing a purely mechanical acoustic signal generator in or on the device; and
   generating the warning signal, via the device, merely by way of the escaping gas from the store housing, wherein
   the device is arranged such that the escaping gas that flows through the device impacts a component of the vehicle body, whereby the vehicle body is caused to perform acoustic oscillations and amplify a sound intensity of the warning signal.

7. The method according to claim 6, wherein
   the signal generator is caused to perform mechanical oscillations by the gas, or causes the gas to perform acoustic oscillations.

8. The method according to claim 6, wherein
   upon exceeding a predefined gas volume flow through the device and/or upon exceeding a predefined pressure gradient from the interior of the store housing in relation to ambient air pressure, the signal generator generates a warning signal with a predefined minimum sound intensity.

9. The method according to claim 6, wherein
   the device permits an exchange of gas both from the interior of the store housing into the surroundings and from the surroundings into the interior of the store housing.

10. The method according to claim 6, wherein
    the device has a semipermeable membrane which permits an exit of water from the interior of the store housing into the surroundings, but prevents an entry of water from the surroundings into the interior of the store housing.

11. The method according to claim 6, wherein
    the device has an element provided for being caused to perform mechanical oscillations in the event of gas flowing through or in the event of gas flowing past, and/or which causes the gas to perform acoustic oscillations in the event of gas flowing through or in the event of gas flowing past.

* * * * *